May 12, 1970     W. T. GRAY ET AL     3,512,166
ANALOG CENTESIMAL RECORDERS
Original Filed March 3, 1967     4 Sheets-Sheet 1
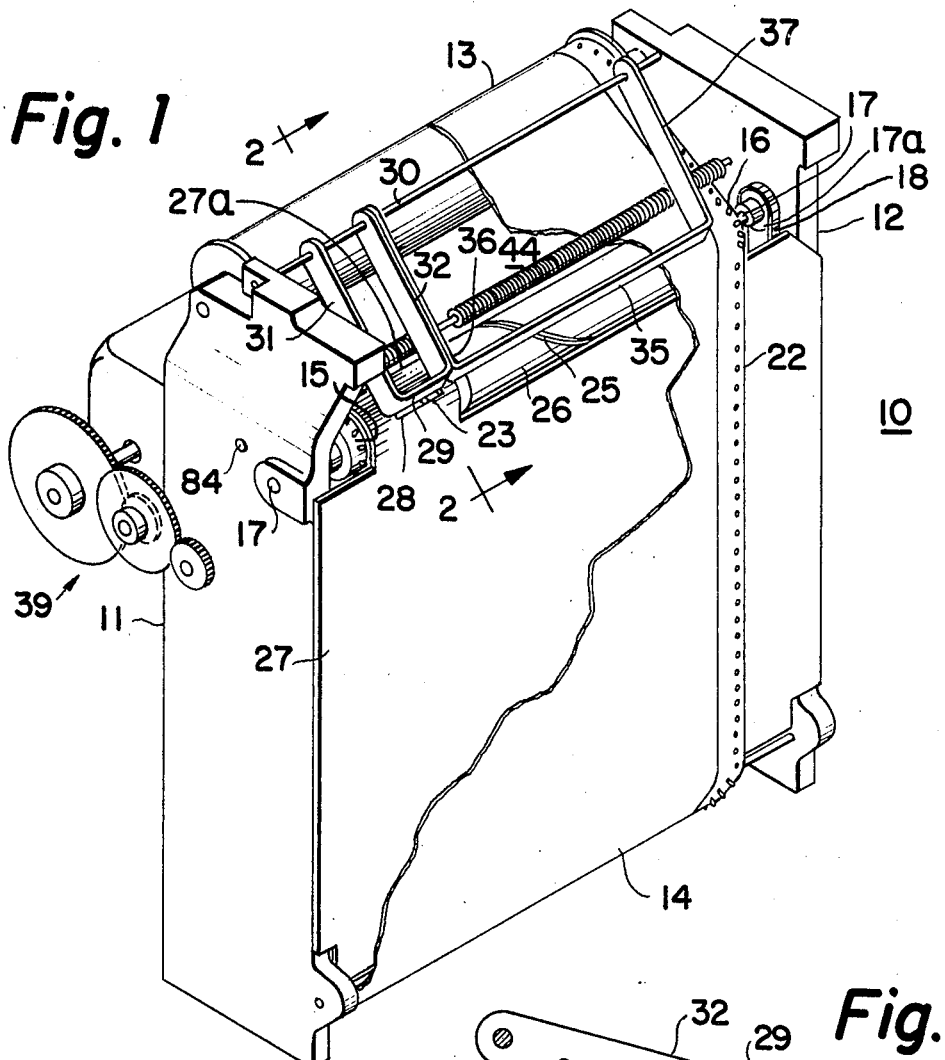
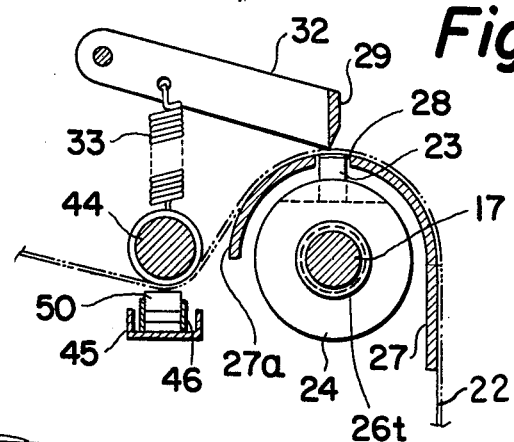
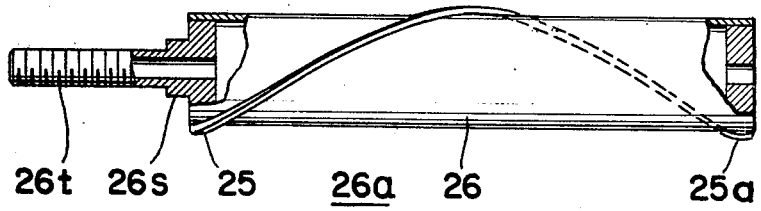

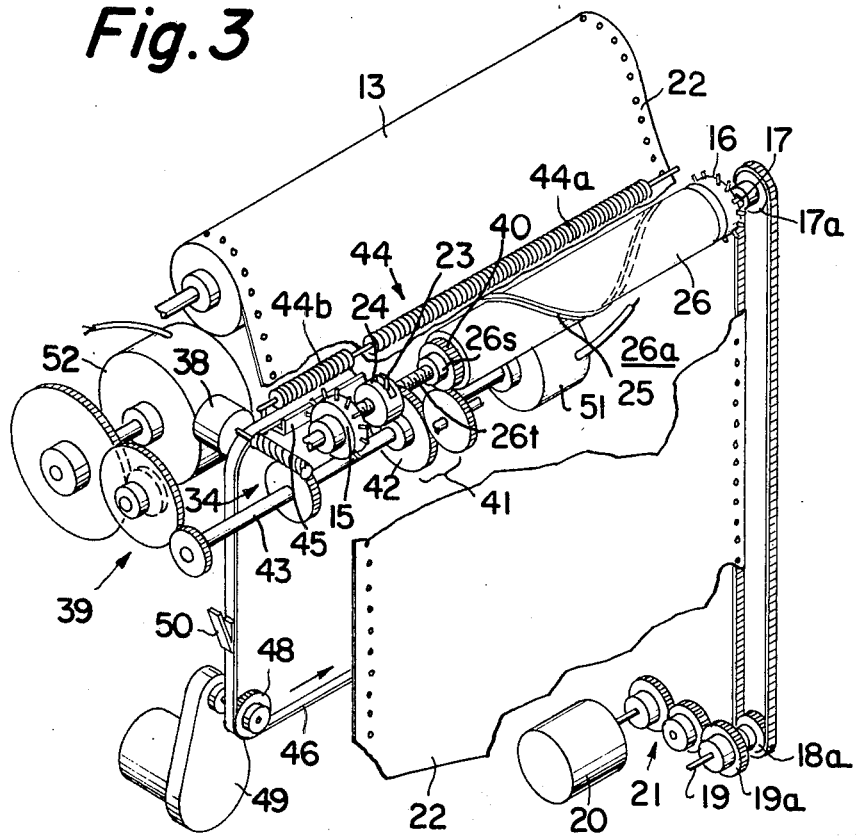

United States Patent Office  
3,512,166  
Patented May 12, 1970

3,512,166
ANALOG CENTESIMAL RECORDERS
William T. Gray, Jenkintown, Raymond W. Ross, Cheltenham, and Albert J. Williams, Jr. Philadelphia, Pa., assignors to Leeds & Northrup Company, Philadelphia, Pa., a corporation of Pennsylvania
Continuation of application Ser. No. 620,366, Mar. 3, 1967. This application Oct. 2, 1968, Ser. No. 766,378
Int. Cl. G01d 9/06
U.S. Cl. 346—23     4 Claims

ABSTRACT OF THE DISCLOSURE

A multi-range, analog centesimal recorder, with wide range and high resolution having one marking means for inscribing a coarse curve on a chart and another marking means for inscribing a fine curve. A driving connection is disposed between the fine and coarse marking means with a speed reduction such that a change in position of the coarse marker by one of the divisions in its path is 100 times as significant, with respect to the input signal, as a change in position of the fine marker by one of the divisions in its path.

CROSS-REFERENCE TO RELATED APPLICATION

This is a streamlined continuation of application Ser. No. 620,366, filed Mar. 3, 1967, now abandoned.

BACKGROUND OF THE INVENTION

Recorders are used in many situations to provide a readable record of a measurable quantity. Quite often, fluctuations in the measured quantity are recorded by a single pen which is positioned transversely across a continuously moving strip chart in accordance with magnitude of the measured quantity. This type of recorder, which will be referred to as a conventional recorder, is shown, for example, in U.S. Pat. 2,113,164 to A. J. Williams, Jr., one of the coinventors herein. Although such recorders have many advantages, one disadvantage is the limitation on the range of the record which may be read with high resolution. The width of the strip chart limits the transverse chart-marking path of the pen. Therefore, since the chart-marking pen is generally used to record the entire expected range of fluctuations in the measured quantity, small fluctuations will not cause sufficient movement of the pen on the chart to enable reading the magnitude of these small fluctuations.

One type of recorder which extends the range which may be read with high resolution is the analog decimal type recorder, such as that shown in U.S. Pat. 3,214,764 to A. J. Williams, Jr. Such a recorder is capable of making, on a given width of chart, a record with high resolution of the values and variation of values of a measured quantity, which varies over a wide range of values. This is accomplished by providing a plurality of records on the chart, each of which has a different significance with respect to the measurable quantity, the ratio in significance of the more significant record to that of the less significant record adjacent to it being just 10 to 1. One limitation on the usefulness of recorders of this type is that the record has lost some of its analog characteristics. It does not give to the viewer the picture with which he is familiar. The record is segmented and often that portion of the record in which the viewer is most interested is in the segmented portion. The fine portion of the analog centesimal record, made in accordance with the present invention, is also segmented but each segment is larger than each segment in the analog decimal record, approximately 10 times larger. As a result of this, the viewer will generally find that the portion of the record of interest to him is not segmented at all.

Another type of recorder which extends the range while permitting reading with high resolution is the recorder disclosed in U.S. Pat. 2,587,079 to F. E. Woods et al. The relation between the significance of coarse and fine records is 20 to 1. Otherwise stated, each visibly distinguishable division in the coarse record has 20 times the significance of each visibly distinguishable division in the fine record. Although the ratio of 20 to 1 in Woods et al. is greater than the ratio of 10 to 1 in the Williams patent, the record of Woods is segmented as much as the record of Williams since the fine record of each is only 10 divisions wide. The chart-marking means of Woods et al. both move in a curved chart-marking path which results in a record with its analog characteristics somewhat obscured. The full range of the recorder of Woods et al. is achieved by 40 passes of its fine chart-marking means through its chart-marking path, while the coarse chart-marking means passes through only 20 divisions. Because there are two passes of the fine chart-marking means through its chart-marking path for each pass of the coarse chart-marking means through one of its divisions, the record is somewhat difficult to read. A further difficulty in reading is caused by the non-decimal relation (20 to 1) between the significance of the coarse divisions and the significance of the fine divisions.

Another example of a recorder with extended range and with high resolution is that shown in Transactions of the American Institute of Electrical Engineers, vol. 71, part I, September 1952, pp. 289–294. In this type of recorder, the coarse reading is recorded in digital form. That is, there is a periodic print of the most significant digit, or digits, and the fine reading is from a curve. In early recorders of this type, the coarse reading was made with a pen moving in stepwise fashion. In either case, the coarse record has quantized steps which fail to provide a clear picture of the trend of a measured quantity. That is, the coarse record will change by a finite step and only when the fine pen reaches one of its limits.

In reading a record made on this type of recorder, it is important to associate the coarse reading before the step change with the fine reading before the step change, and equally important to associate the coarse reading after the step change with the fine reading after the step change. This may become difficult when there are several step changes within a short space on the record as the result of fluctuations of the measuring quantity around a range-change value.

The foregoing background demonstrates some of the problems encountered in making a recorder with extended range and with high resolution. The present invention obviates many of these problems.

SUMMARY OF THE INVENTION

In the particular embodiment of the invention shown there is provided a multi-range strip chart recorder having a fine marking means and a coarse marking means with a driving connection disposed between them. The driving connection drives the coarse marking means much slower than the fine marking means in response to a given rate of change of the input signal. The speed reduction is such that a change in position of the coarse marking means by one division in its path is 100 times as significant, with respect to the input signal, as a change in position of the fine marking means by one of the divisions in its path. The large speed reduction in this driving connection includes a nut and screw arrangement. In the particular embodiment shown, the input signal is from the filament circuit of the lamp of an optical pyrometer. One aspect of the present invention includes the use of a 360° slidewire in the balancing network of a recorder for use with an optical pyrometer.

Further aspects of the disclosure include a pressure device for marking reference lines on the chart without presenting an unnecessarily large drag on the movement of the strip chart. Additionally there is included for the coarse marking means a cover plate having a section through which the coarse marking means extends. This section has a radius which is the same as the radius of a helical thread utilized for the fine marking means.

For a better understanding of applicants' invention, reference is to be had to the following detailed description taken in conjunction with the accompanying drawings in which:

FIG. 1 is a perspective view of a main frame assembly for a strip chart recorder in accordance with applicants' invention with a portion of the chart cut away;

FIG. 1a is an enlarged front elevation, with portions in section, of a part used in the chart-marking means of FIG. 1;

FIG. 2 is a side elevation taken along the lines 2—2 of FIG. 1 to show the relationship of the coarse chart-marking means and the means for applying the reference marks to the chart;

FIG. 3 is an exploded perspective view similar to that of FIG. 1 with some parts omitted and others broken away to show main structural elements for producing a record in accordance with applicants' invention;

Figure 4:
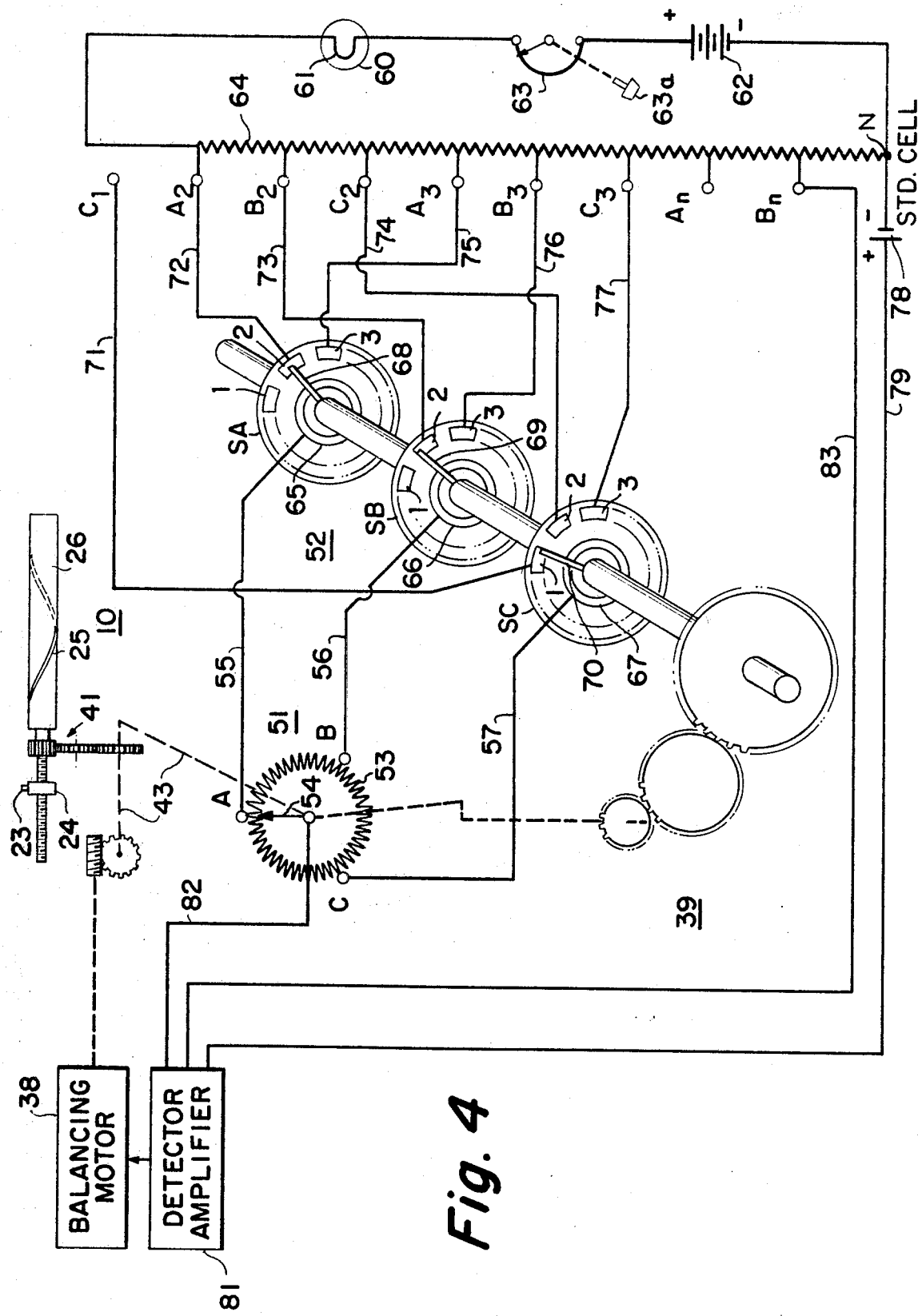
FIG. 4 is a simplified illustration of a circuit suitable for use in a recorder of the type described.

Referring to FIG. 1, it will be seen that a main frame assembly of a recorder 10 includes a pair of parallel side plates 11 and 12 which support various elements of the recorder. A chart supply roll 13 and a chart reroll 14 are supported for rotation by the side plates 11 and 12. The chart is withdrawn from the supply roll 13 by chart drive wheels 15 and 16 which are attached to a shaft 17. The shaft 17 is rotated by a sprocket 17a driven by a chain 18 from a driving sprocket 18a (FIG. 3). As shown in FIG. 3, driving sprocket 18a is fastened to a driven gear 19a mounted for rotation about a shaft 19 supporting the reroll 14 shown in FIG. 1. The reroll 14 is driven with the gear 19a through a slip clutch, not shown. The driven gear 19a is driven by a chart drive motor 20 through a gear train 21 which effects the desired chart speed. Chart drives of the type just described are well understood by those skilled in the art and form no part of the present invention.

The chart 22 is shown broken away so that the coarse and fine marking means can be seen. The chart 22, in the form illustrated, is a pressure sensitive paper; that is to say, a paper on which a black mark is produced when an element in the form of a stylus is pressed against the paper with a moderate force.

A marking means usable in the present invention comprises a structure 26a, shown in FIG. 1a, rotatable about shaft 17. A coarse marking means 23, see FIG. 2, comprises a projection which extends radially from a threaded nut 24 which engages a threaded portion 26t of the structure 26a, shown in detail on an enlarged scale in FIG. 1a. The parts 23 and 24 are best shown in FIGS. 2, 3 and 4. The fine marking means 25 is comprised of a helical thread, that is to say, a raised portion supported on a drum 26 of structure 26a. This thread extends for a distance somewhat greater than 360° about the drum 26 so that the extreme ends of the helix may make a record on the chart 22 simultaneously.

The extensions of the helical thread beyond 360° provide means for extending the chart-marking path of the fine marking means 25. By extending the chart-marking path of the fine marking means beyond the length required for recording all values of the input signal, the fine marking means 25 can record in duplicate all values of the input signal adjacent the low and high ends of its calibrated chart-marking path. The chart 22 is inserted under a threaded member 44, later to be described, and over the marking means 25 and 23. A curved portion 27a, of a chart back-up plate 27, is coextensive with the outer diameter of drum 26 to provide uniform back-up for the chart in the region of the threaded portion 26t. A slot 28 in the chart back-up plate 27 prevents rotary motion of the nut 24 about the threaded portion 26t, thereby confining movement of the coarse marking means 23 to a linear motion transverse the chart for a distance substantially coextensive with the length of the slot 28. A dull knife-edge 29 is supported for rotation about a shaft 30, journaled in the parallel side plates 11 and 12, by support arms 31 and 32. As shown in FIG. 2, a spring 33 having one end fastened to arm 32 and the other end to the threaded member 44, which is journaled in the side plates 11 and 12, biases the knife-edge 29 against the chart 22 and, in turn, the chart is biased against the coarse marking means 23, thereby to effect marking of the pressure sensitive chart at the point of intersection of coarse marking means 23 and the knife-edge 29.

In a similar manner, the helical thread 25 forms a dull knife-edge disposed spirally around the drum 26. A dull knife-edge 35 is supported by arms 36 and 37, journaled on shaft 30, and is spring-biased, by means not shown, against the chart to produce pressure at the point of intersection of the knife-edge 35 and the helix, thereby to produce a mark on chart 22. As has been previously mentioned, and for reasons later to be described, the ends of the fine marking means 25 overlap since the helix extends more than 360° about the drum 26. The drum 26 is a part of the structure 26a which includes the threaded portion 26t and a shoulder 26s, as shown more clearly in FIG. 1a.

The coarse and fine recording means 23 and 25 are driven, in a manner later to be described, by the balancing motor 38 of the measuring system of the recorder through a gear train 41 and other gearing, shown in FIG. 3.

Referring now to FIG. 3, there is shown an exploded perspective view of the recording mechanism with some parts omitted and others broken away. In this view, the same reference numerals have been applied to those parts corresponding to the ones already described. Secured to the shoulder 26s of structure 26a is a gear 40 which is part of a gear train 41 which includes gear 42 secured to a shaft 43. The balancing motor 38 of a self-balancing measuring system drives the shaft 43 through a worm and wormwheel combination 34. The balancing system may be of the type disclosed in the aforementioned A. J. Williams, Jr., Pat. 2,113,164. Since this patent discloses electrical self-balancing recorders of a type well known to those skilled in the art, a detailed description of the operation of such a recorder will be omitted.

In self-balancing recorders of the aforementioned type, any change in the value of a measured quantity unbalances the measuring system and the balancing motor of the recorder operates in a direction and to the extent necessary to restore balance in the measuring network by adjustment of a slidewire contact with respect to a slidewire. In the present recorder, as mentioned above, the motor 38, when operated, imparts motion to the shaft 43 by means of the worm and wormwheel 34 thereby rotating gear 42 which drives through the gear train 41 to rotate gear 40 and to position the coarse and fine marking means 23 and 25. The pitch of thread 26t is such that for each complete revolution of the drum 26, the nut 24 is moved along the longitudinal axis of structure 26a a distance equal to one-hundredth the distance between the zero and one hundred percent calibration marks on the portion of the chart 22 which receives its record from the helix, for reasons later to be explained. Operation of the motor 38 is controlled by the measuring circuit which includes a potentiometer 51 which provides the self-balancing feature. From the foregoing, it will be understood that the curve produced upon the chart by the fine marking means 25 is plotted to a scale one hundred times larger than the curve produced by the coarse marking means 23. In this embodiment of the invention the balancing motor 38, worm and wormwheel combination 34, shaft 43, gear train 41, and threaded portion 26t provide means responsive to the magnitude of the input signal for driving the coarse marking means 23 through its chart-marking path to establish a first relation between change in position of the coarse marking means 23 and a given change in the input signal. Balancing motor 38, worm and wormwheel combination 34, shaft 43 and gear train 41 also provide means responsive to the magnitude of the input signal for driving the fine marking means 25 through its chart-marking path to establish a second relation between the change in position of the fine marking means 25 and a given change in the input signal. The threaded portion 26t and the single turn of the helix, which provides marking means 25, provide means for proportioning the first and second relations so that the visibly distinguishable divisions of the chart-marking path of the coarse marking means each have a significance with respect to the input signal of 100 times the significance of the corresponding visibly distinguishable divisions of the chart-marking path of the fine marking means with respect to the input signal. It will be apparent that other parameters could be changed to obtain the proportioning of the movements of the two chart-marking means in relation to each other.

In accordance with an important aspect of the invention wherein multiple use is made of the portion of the chart marked by the fine chart marking means, the proportioning means is set to drive the fine marking means through a number of passes, or sweeps, across the portion of the chart on which it records for full range of the recorder. This number is set to be equal to the number of visibly distinguishable divisions through which the coarse marking means 23 is driven for full range of the recorder.

In accordance with another important aspect of the present invention, the threaded nut 24 is driven by threaded portion 26t, and maintained in position by the slot 28, in such a manner as to provide means for driving the coarse marking means 23 in a straight line path across a portion of the width of the chart 22. Furthermore, this straight line path is a portion of an infinite straight line crossing the chart, as contrasted with prior art type recorders such as that of the Woods et al. patent in which the chart-marking path is curved. Note also that the helical thread on the drum 26 provides means for driving the fine marking means through a chart-marking path which also is a straight line. In the embodiment shown this straight line path is a portion of the same infinite straight line, although two parallel straight line paths could be used to facilitate passing of the chart-marking means.

Due to the extremely high resolution made possible by a ratio as large as 100 to 1 between the motions of the marking means 25 and 23, it becomes necessary to avoid errors which might be introduced into the record as a result of expansion or contraction of the material of which the chart is made, for example, due to changes in humidity. Otherwise, the benefits of the high resolution will be lost. To avoid the foregoing problem, a third marking means is provided supported between the side plates 11 and 12. It comprises the threaded member 44 which functions as a serrated edge having a portion 44a overlying the chart area which receives its record from the fine marking means 25 and a portion 44b overlying the chart area which receives its record from the coarse marking means 23. While not shown in detail, in order to avoid making the drawings more complex, it is to be understood that the threaded member 44 is, in the modification illustrated, a two-piece shaft having portions 44a and 44b comprised of screw threads each having a one millimeter lead. The portion 44b is relatively adjustable with respect to the portion 44a in order that the nut 24 may be set with the coarse marking means 23 at a zero position when the desired portion of the fine marking means 25 is in its zero position relative to the chart 22. After the setting is made, the composite threaded member 44 is secured rigidly in place, as shown in FIG. 1, by screws 84 passing through the side plates 11 and 12 of the recorder and received in tapped holes in the ends of the composite threaded member 44. The threaded member 44, constructed and arranged as described, effectually provides two groups of styli which overlie the chart and in which the styli in each group are spaced one millimeter apart.

Beneath the chart and in spaced relation thereto, at a location parallel with the member 44, is a track 45 of U-shaped construction which provides guide structure for a sprocket chain 46. This chain 46 is guided through a rectangular path by means of track 45, a guide pulley not shown, and a driving sprocket 48, driven by a small synchronous motor 49. The chain 46 supports a pressure plate 50 of suitable spring material such that as the chain is driven in a direction shown by an arrow, the pressure plate 50 will periodically come to a position beneath the chart 22 at the right end of the track 45 and make a longitudinal pass across the chart directly beneath the serrated member 44, thereby progressively to apply pressure between the chart and the serrated teeth, or styli, on the portions 44a and 44b. The result is the production of calibration marks across the chart spaced laterally a distance of one millimeter between marks in each group, as is best seen in solid lines in FIG. 5. Actually, these calibration lines are dotted lines with the spacing between the marking means of a recorder and the means a function of the speed of motors 49 and 20. In the foregoing manner, calibration marks are applied to the chart just prior to application of the record on the chart, hence, the relationship between the record and the calibration lines is not disturbed upon expansion and/or contraction of the chart as a result of changes in humidity or the like. It should be clearly understood that the application of calibration lines to the chart at substantially the same time the record is being made is of itself not new. However, an advantage of applicants' method of effecting this is that it avoids the production of any noticeable drag upon the chart so that the advance of the chart with time is not disturbed.

As is understood by those skilled in the art, coaction between the marking means of a recorder and the means which produces or effects balance of the measuring network is customarily effected by driving the device which produces balance in the measuring network and the marking means of the recorder from the same motor means. In the subject recorder, as has already been described, the motor 38 drives the shaft 43 and, through gearing, the marking devices 23 and 25. The measuring circuit of the subject recorder employs a continuous, circular slide-wire in the potentiometer 51, the adjustable contact of which is moved by the shaft 43. The shaft 43 additionally operates through a gear train 39 to actuate rotary switch structure 52, for reasons and in a manner later to be described in connection with FIG. 4.

The use of a continuous circular potentiometer having three or more taps, together with means for switching in a manner to place low impedance sources of potential of different magnitudes in circuit with tapped segments of the circular slidewire, is the invention of Rowland G. Lex, Jr., a co-employee of applicants, and is the subject matter disclosed and claimed in Lex Jr. Pat. 3,380,066, issued Apr. 23, 1968. Applicants have developed a novel modification of the invention of Lex to provide a measuring circuit for their recorder to effect measuring and recording a current with enhanced resolution and precision. It has utility for recording the temperature measured with an optical pyrometer. This recorder is used to illustrate the benefits to be derived by relating coarse and fine records of a multi-range recorder in a ratio of an entirely different order of magnitude than heretofore employed in prior art recorders which provide a pair of true analog records readable to one part in 3400 without interpolation. The record of the recorder illustrated can be read from 26 ma. up to 60 ma. to the nearest 0.01 ma.

As is well known by those skilled in the art, an optical pyrometer is a device for measuring the temperature of incandescent bodies which employs a structure having an optical system associated with the filament of a lamp in a manner such that the operator of the device sights the pyrometer upon an incandescent body and views the filament of the pyrometer lamp with the radiating body forming a background. The operator then adjusts the current through the lamp filament until the filament glows and he gets an optical match. That is to say, the filament is brought to brightness equal to that of the background so that the central portion of the filament disappears in the background. Such lamps are calibrated in a manner that the current to the lamp filament becomes a measure of the temperature of the hot body by the use of a conversion table or directly by characterizing the recorder slidewire and calibrating the chart and scale in terms of temperature.

In FIG. 4, there is shown, in diagrammatic form, a lamp 60 which is representative of the lamp of an optical pyrometer. Current through the filament 61 of the lamp 60 is derived from a current supply, illustrated as a battery 62, and is adjusted to a desired value by an operator by manipulation of a control knob 63a of a rheostat 63. The battery 62, rheostat 63, and lamp 60 are in the optical pyrometer. A dropping-resistor 64 is located in the recorder. This resistor has many suitably spaced taps and is connected in series with the battery 62, rheostat 63, and lamp 60 so that the lamp current passes through the resistor 64. The potentiometer 51 of recorder 10 is comprised of a continuous circular slidewire 53 of rather high resistance (20,000 ohms) having three equally spaced taps A, B, and C. This continuous slidewire 53 has a movable contact 54. Taps A, B, and C are symmetrically distributed about the slidewire 53, that is to say, at 120° intervals. These taps are connected by conductors 55, 56 and 57 to slip rings 65, 66 and 67 on the switches SA, SB, and SC which function to connect segments of the slidewire 53 in parallel with selected portions of the tapped dropping-resistor 64 to form a balanceable measuring circuit. The dropping-resistor 64, as illustrated, includes a plurality of taps $C_1$, $A_2$, $B_2$, $C_2$, $A_3$, $B_3$, $C_3$, $A_n$, $B_n$, connected to fixed contacts 1, 2, 3, etc., of switches SA, SB, SC by way of conductors 71–77, and similar conductors not shown. These are limited in number in FIG. 4 since they serve only to illustrate how the recorder operates. In practice, for the recorder illustrated, the potential of the battery 62, in conjunction with rheostat 63 and lamp filament 61, is such as to provide a current range from about 26 to 60 milliamperes. Hence, the recorder with this circuit functions as a current-recorder having a continuous range from 26 to 60 milliamperes and is capable of producing a record which can be read to 0.01 milliampere without interpolation. To accomplish this, the dropping-resistor 64 will have 36 taps and a total resistance of about 39.2 ohms with each tap locateed to provide a range of 1 milliampere across the fine marking section of the chart.

An inspection of FIG. 4 discloses, with the switches SA, SB, and SC in the positions shown, the entire resistance of resistor 64 from tap $A_2$ to N is included in the measuring circuit when slidewire contact 54 is at tap A of the continuous slidewire 53. This forms a circuit in which the potential drop across resistor 64 may be placed in opposition with the potential of a standard cell 78. For a current-recorder with a range of 26 to 60 milliamperes, the total resistance of resistor 64 will be approximately 39.2 ohms when the current is 26 milliamperes in order to produce a potential drop of a magnitude to balance a potential of 1.019 volts from the standard cell 78. When the current is 60 milliamperes, the included portion of resistor 64 which is necessary to produce a potential drop of the magnitude required to balance a potential of 1.019 will be approximately 16.99 ohms. The tap points along resistor 64 are found by calculating the resistance necessary to produce balance when the current is increased in increments of 1 milliampere.

The switches SA, SB, SC are operated by the balancing motor 38 of the recorder in a sequential manner to place segments of resistance between taps of the circular slidewire 53 in parallel with portions of resistance between taps of resistor 64 to alter the measuring circuit as required for changes in the range of the current to be recorded. The movable contact 54 of circular slidewire 53 provides means continuously to compare a potential from this circuit with that of the standard cell 78, regardless of the instant range of the measuring circuit. As may be seen from the connections established by the switches in the positions illustrated in FIG. 4, the segment of circular slidewire 53 between taps A and B is connected in parallel with the segment of resistor 64 between taps $A_2$ and $B_2$ and the segment of slidewire 53 between taps B and C will become connected in parallel with the portion of resistor 64 between taps $B_2$ and $C_2$ if motor 38 operates to rotate switch contacts 68–70 clockwise. When an operator of the pyrometer adjusts knob 63a to reduce the included amount of resistance of rheostat 63 thereby to increase the current through the filament 61 of lamp 60, this will unbalance the measuring circuit and cause motor 38 to effect clockwise rotation of contact 54. At about the 60° point, the movable switch contacts 68, 69, and 70 will have moved far enough for contact 70 to engage the number 2 contact of switch SC to connect tap C of circular slidewire 53 to tap $C_2$ of resistor 64 in preparation for the next higher current measuring range for recorder 10.

As shown in FIG. 4, the circuit is in balanced condition for a current of 26 milliamperes, i.e., the IR drop from $A_2$ to N will balance the EMF of standard cell 78 applied to the detector amplifier 81 by way of conductors 79 and 82 and no error voltage will be produced. A conductor 83 is shown which provides a suitable connection for a filtering and damping circuit which is part of the detector amplifier 81. When the current to lamp filament 61 is increased, the IR drop, i.e., the drop in potential between taps $A_2$ and tap N of resistor 64 will increase and no longer be equal to the EMF of standard cell 78. An error voltage is then applied to the input of detector amplifier 81 which causes motor 38 to run in a direction to adjust the relationship between contact 54 and circular slidewire 53 until a point is reached at which the potential drop between contact 54 and tap N of resistor 64 balances the EMF of standard cell 78. At the same time, while adjustment between circular slidewire 53 and contact 54 is being effected, the parts of the recording means 23 and 25 are moved to record the change in current on the recorder chart 22 and the switch contacts 68, 69, and 70 are being moved to effect change in the connections between the taps of slidewire 53 and the taps of resistor 64 to change the measuring circuit for each new range required with the switching taking place at a time when the contact 54 is not traversing segments of the slidewire 53 adjacent the taps being switched.

In a manner more fully described in the above-mentioned application to Rowland G. Lex, Jr., the timing of the operation of switches SA, SB, and SC is such that continued increase of the current through filament 61 effects movement of contact 54 around circular slidewire 53. When contact 54 is about halfway between taps A and B of slidewire 53, tap C will be connected to tap $C_2$ of resistor 64 so that upon arrival of contact 54 at tap B, it may continue to effect a reduction in the included portion of resistor 64 by traverse of the portion of circular slidewire 53 between taps B and C which is now connected in parallel with the portion of resistor 64 between taps $B_2$ and $C_2$. When the contact 54 is about halfway between taps B and C, tap A will be switched to tap $A_3$ of resistor 64 to set up the next recording range. In this manner, change in range is rendered continuous. Upon completion of movement of contact 54 from C to A, it will have made a complete revolution about circular slidewire 53 and tap B will have been switched as contact 54 passed through the 300° position so that everything is ready to continue for another revolution. The number of revolutions possible for contact 54 when measuring the highest possible value will, of course, be dependent upon the number of taps provided along resistor 64.

The ratio of gear train 41 is such that the fine marking means 25 on drum 26 makes a complete revolution and records a single curve across the right-hand portion of chart 22 as the contact 54 moves from one tap to the next on slidewire 53; hence, drum 26 will have made three revolutions and the chart-marking point, which is the intersection of the blunt knife-edge 35 and fine marking means 25, will have effectively crossed its recording area of the chart 22 three times, and the coarse marking means 23 will have moved to the right across three divisions of its chart-marking area for one complete revolution of the contact 54.

Figure 5:
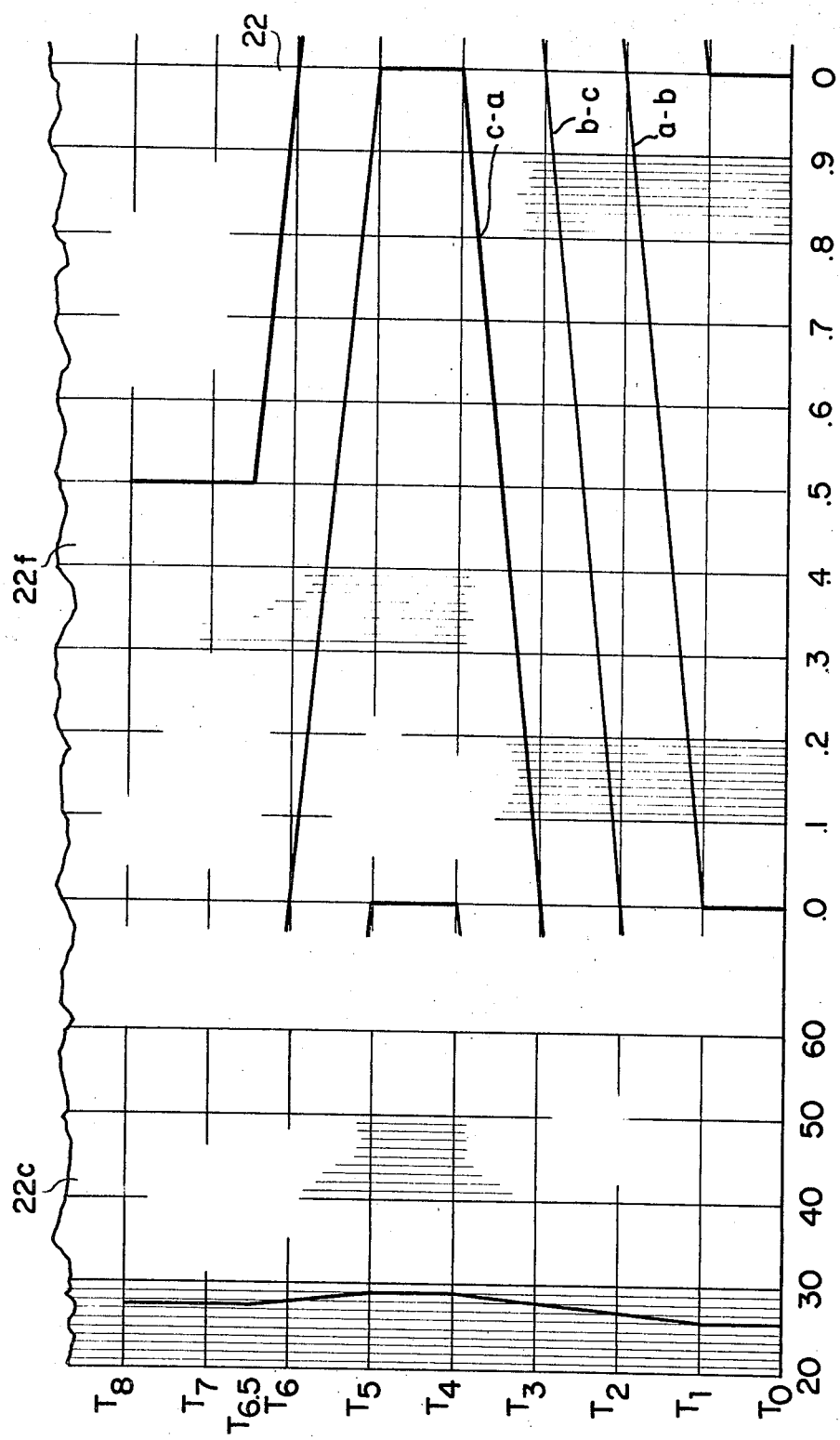
FIG. 5 shows a facsimile of a chart record made in accordance with applicants' invention.

FIG. 5 is illustrative of the type of record made in accordance with applicant's invention. As pointed out earlier in this specification, the parameters for the recorder illustrated have been selected to record current ranging from 20 to 60 milliamperes. In FIG. 5, reference lines and time lines have been shown as solid lines on the chart 22 for ease of reproduction of an illustrative record. However, it is clearly to be understood that the vertical reference lines of FIG. 5 will, in actual practice, be dotted or short dashed lines since they are applied sequentially by the traverses of the pressure plate 50 as the chart moves downwardly, as seen in the various figures of the drawing, as a function of time. These reference marks should be sufficiently separated to be visibly distinguishable. A separation of about 1 mm. is the lower limit. In practice, time lines are indicated on the record chart by stopping the motor 49 for selected time intervals to leave a blank area across the width of the chart. In FIG. 5, for the sake of clarity, most of the reference lines have been omitted. Only in portions of FIG. 5 have neighboring lines been drawn.

No instrument scale has been shown in any of the figures in order to preserve viewability of the important structural features of the instrument. However, as will be understood by those skilled in the art, an instrument scale will be associated with the chart. As a substitute for the scale, numbers have been applied in FIG. 5 to designate the value of the major calibration lines. For illustrative purposes, it has been assumed that at time zero the current through the pyrometer lamp is at its minimum value of 26 milliamperes hence the marking means 23 and 25 will be positioned at 26 and zero respectively. That is to say, the coarse marking means 23 will have been adjusted relative to the fine marking means 25 so that both cooperate with their respective knife-edge structures 29 and 35 to apply pressure at the calibration lines representative of 26 and .0. As will be observed during the time interval from $T_0$ to $T_1$, the current value does not change. During the time interval $T_1$ to $T_2$ the current to the pyrometer lamp is gradually increased at a uniform rate from 26 milliamperes to 27 milliamperes. While this is clearly shown in the left-hand recorded portion of chart 22, it will readily be recognized that it is impossible to read precise values of current from the left-hand recorded area of chart 22 at times intermediate $T_1$ and $T_2$. On the right-hand portion of the chart, since the horizontal distance between each vertical calibration line has only 1/100 the significance of the horizontal distance between vertical calibration lines in the left-hand section of the chart, it is possible clearly to read milliamperes to 0.01 part.

Since there are 34 usable divisions in the left-hand recorded area of the chart which accommodates the range trace the readability of the chart is one part in 6,800 by estimating to ½ of a fine division which is many times better than can be achieved by only a single chart-marking means and by single use of the chart width.

From the description of the operation of the recorder, particularly as set forth in FIG. 4, it will be evident that during the interval from $T_1$ to $T_2$ the structure 26a, as shown in FIG. 1a, will make a complete revolution. As will be evident, during the complete revolution of structure 26a the coarse marking means 23 will be carried to the right a distance equal to the distance between a pair of calibration lines in chart area 22c as a result of the threaded portion 26t carrying nut 24 to the right and fine marking means 25, which extends a distance greater than 360° about drum 26, will not only scribe a curve a–b extending all of the way across section 22f of chart 22 to the zero calibration line at the right side of section 22f of the chart but, in addition, the lead portion of fine marking means 25 will begin to scribe a portion of a second curve b–c beginning to the left of the left-hand zero in chart section 22f which duplicates the portion of record trace a–b recorded on the right side of chart section 22f between about 0.95 and the right-hand zero, which is an equal valued reference mark with the left-hand zero. This insures that no portion of the record will be lost. It also avoids needless segmentation of the record for a fluctuating input signal. Upon continued increase in the lamp current, the balanceable network causes motor 38 to continue moving contact 54 clockwise about slidewire 53 over the portion of the slidewire between taps B and C which was readied for recording during the traverse of contact 54 from A to B in a manner already described.

Simultaneously, structure 26a is rotated during the time interval between $T_2$ and $T_3$ and the coarse marking means 23 will move another division to the right to scribe a continuation of the record in chart area 22c and fine marking means 25 will effect completion of a second mark applying traverse across section 22f of the chart thereby continuing curve b–c to the right-hand zero calibration line. It will be noted from curve a–b, slanting upwardly to the right, that the overlapping portion of fine marking means 25 at the right end of drum 26 continues to record an extension of curve a–b from the right-hand zero to the right-hand margin of chart section 22f, thus duplicating the initial portion of curve b–c from zero to about 0.05. This again insures that no portion of the record will be lost. Since the more significant figure is read from the chart section 22c, it is clear that one may read a value such as 27.02 from the right-hand portion of curve a–b or the left-hand portion of curve b–c.

During the interval of time between $T_3$ and $T_4$, the chart record in section 22c shows that the lamp current increased from 28 to 29 milliampers. The curve c–a, traced in chart section 22f, was traced as contact 54 traversed the portion of slidewire 53 between contacts C and A in a clockwise direction. The range record clearly shows that is the third range and, as will be understood from the previous description of the recorder, subsequent changes in range are effected by the switches SA, SB, and SC and repeated traverses of the slidewire 53 by the movable contact 54. From the foregoing, it is evident that a number of passes is made across the fine section of the chart which constitutes a multiple use of the portion of the chart marked by the fine marking means 25. The balance of the chart record shows that for the interval of time between $T_4$ and $T_5$, the lamp current was maintained constant at 29.00 milliamperes and then during the time interval $T_5$ to $T_{6.5}$ returned to 27.50 milliampers and remained steady during the time $T_{6.5}$ to $T_8$.

While particular embodiments of the invention have been shown and described, it will, of course, be understood that various modifications may be made without departing from the principles of the invention. The appended claims are, therefore intended to cover any such modifications within the true spirit and scope of the invention.

What is claimed is:

1. In an analog strip chart recorder for recording an input signal with high resolution on a strip chart having two analog type records of different significance with multiple use being made of a portion of the width of said strip chart, said recorder comprising:

drive means for continuously driving said strip chart in a lengthwise direction, coarse chart-making means arranged for movement transversely of said strip chart throughout a chart-marking path, said chart throughout said path being divided by reference marks into visibly distinguishable divisions, fine chart-marking means arranged for movement transversely of said strip chart throughout a chart-marking path, said chart throughout said last-named path being divided by reference marks into visibly distinguishable divisions, said chart-marking path of said fine chart-marking means having a length of at least about one hundred millimeters, said reference marks of the chart-marking path of said coarse chart-marking means dividing said last-named chart-marking path into equal divisions each having a length approximately equal to $\frac{1}{100}$ the length of said chart-marking path for said fine chart-marking means, means producing movement of said coarse and said fine chart-marking means across portions of the width of said strip chart, having said reference marks thereon, in response to a change in the magnitude of a measured quantity to be recorded, means proportioning said movement of said course chart-marking means relative to the movement of said fine chart-marking means in response to said input signal to render each visibly distinguishable division of said course chart-marking path exactly one hundred times as significant with respect to the measured quantity as each visibly distinguishable division of said fine chart-marking path, and means for extending said chart-marking path of said fine chart-marking means outside a region embraced by a pair of equal-valued reference marks defining therebetween a complete calibrated group of said visibly distinguishable divisions thereby to make a duplicate record, outside said calibrated group, of the value of said input signal when said fine chart-marking means is producing a record within said calibrated group adjacent one of said equal-valued reference marks.

2. In an analog strip chart recorder for recording an input signal with high resolution on a strip chart having two analog type records of different significance with multiple use being made of a portion of the width of said strip chart, said recorder comprising:

drive means for continuously driving said strip chart in a lengthwise direction, coarse chart-marking means arranged for movement transversely of said strip chart throughout a chart-marking path, said chart throughout said path being divided by reference marks into visibly distinguishable divisions, fine chart-marking means arranged for movement transversely of said strip chart throughout a chart-marking path, said chart throughout said last-named path being divided by reference marks into visibly distinguishable divisions, said chart-marking path of said fine chart-marking means having a length of at least about one hundred millimeters, said reference marks of the chart-marking path of said course chart-marking means dividing said last-named chart-marking path into equal divisions each having a length approximately equal to $\frac{1}{100}$ the length of said chart-marking path for said fine chart-marking means, means producing movement of said coarse and said fine chart-marking means across portions of the width of said strip chart, having said reference marks thereon, in response to a change in the magnitude of a measured quantity to be recorded, means proportioning said movement of said coarse chart-marking means relative to the movement of said fine chart-marking means in response to said input signal to render each visibly distinguishable division of said coarse chart-marking path exactly one hundred times as significant with respect to the measured quantity as each visibly distinguishable division of said fine chart-marking path, and third chart-marking means disposed adjacent said coarse and fine chart-marking means for producing upon the chart said reference marks for dividing said chart and said chart-marking paths into visibly distinguishable divisions, said third chart-marking means including:

a serrated element for producing by pressure engagement with the chart, said reference marks forming visibly distinguishable divisions, and means for producing said pressure engagement progressively across the width of said chart to push the chart against individual serrations of said serrated element one after the other serially to develop said reference marks on said chart.

3. A recorder as recited in claim 2 in which said means for producing said pressure engagement with said chart comprises:

a driven endless element having at least one pressure applying member thereon movable lengthwise past said serrated element for progressively pushing said chart against individual serrations of said serrated element.

4. An automatic self-balancing type centesimal strip chart recorder comprising:

coarse and fine chart-marking means producing only two analog records for a single measured quantity, both of said chart-marking means being movable transversely of the chart, means responsive to the magnitude of said measured quantity driving both of said chart-marking means for concurrently driving them transversely of said chart, said driving means including proportioning means for driving said coarse chart-marking means at $\frac{1}{100}$ the speed of said fine chart-marking means for producing upon the chart coarse and fine records having a centesimal relationship between them, said chart having a width of at least 100 millimeters to accommodate reference marks applied thereto with a minimum spacing therebetween of about 1 millimeter, said fine chart-marking means being characterized by movement across a chart-marking path of length at least equal to 100 of the minimally spaced reference marks for producing from its record on the chart indications of at least two of the less significant figures of the numerical value of said measured quantity and the record produced on said chart by said coarse chart-marking means producing indications of at least two of the more significant figures of said measured quantity, said fine chart-marking means being constructed and arranged for producing a plurality of curve segments the entire length of its chart-marking path, said coarse and fine chart-marking means permitting production of coarse and fine records from which the magnitude of said measured quantity can be determined with high resolution by the reading of the less significant figures from the record on the chart made by said fine chart-marking means and reading the more significant figures from the record produced on the chart by said coarse chart-marking means, and a self-balancing system including:

a circular slidewire having three or more equally-spaced taps therealong defining a plurality of slidewire segments and a slidewire contact relatively adjustable about said slidewire, a tapped resistor having an impedance such that the impedance of each element thereof between taps has an impedance which is low compared to that of each of said slidewire segments, switch means for sequentially connecting adjacent elements of said tapped resistor in parallel respectively with adjacent segments of said slidewire, and a drive connection from said means for driving both of said chart-marking means to adjust the relative position of said slidewire contact with respect to said slidewire and to switch the connection between one of the taps of said tapped resistor and one of said taps of said slidewire at a time when said slidewire contact is contacting a segment of said slidewire other than the segments directly connected to said tap being switched.

References Cited

UNITED STATES PATENTS

| | | | |
|---|---|---|---|
| 3,380,066 | 4/1968 | Lex | 346—32 |
| 1,975,180 | 10/1934 | Sparling | 346—8 |
| 639,306 | 12/1899 | Steinbart | 346—23 X |
| 2,516,217 | 7/1950 | Keinath | 346—33 |
| 2,587,079 | 2/1952 | Woods et al. | 346—66 |
| 2,673,136 | 3/1954 | Stein et al. | 346—33 |

FOREIGN PATENTS 121,343  4/1948  Sweden.

JOSEPH W. HARTARY, Primary Examiner

U.S. Cl. X.R.

346—66